United States Patent
Bywater (10) Patent No.: US 10,605,111 B2
(45) Date of Patent: Mar. 31, 2020

(54) TURBINE GENERATOR WITH AN INTERNAL ROTOR SUPPORT SHAFT

(71) Applicant: CUMMINS LTD, Huddersfield (GB)

(72) Inventor: John Bywater, Huddersfield (GB)

(73) Assignee: Cummins Ltd., Huddersfield (GB)

( * ) Notice: Subject to any disclaimer, the term of this patent is extended or adjusted under 35 U.S.C. 154(b) by 62 days.

(21) Appl. No.: 15/520,400

(22) PCT Filed: Jul. 27, 2015

(86) PCT No.: PCT/GB2015/052167
§ 371 (c)(1),
(2) Date: Apr. 19, 2017

(87) PCT Pub. No.: WO2016/016626
PCT Pub. Date: Feb. 4, 2016

(65) Prior Publication Data
US 2017/0268373 A1  Sep. 21, 2017

(30) Foreign Application Priority Data

Jul. 28, 2014  (GB) .................................. 1413315.1

(51) Int. Cl.
*F01D 15/10* (2006.01)
*H02K 7/08* (2006.01)
(Continued)

(52) U.S. Cl.
CPC .............. *F01D 15/10* (2013.01); *F01D 25/16* (2013.01); *F16C 33/6677* (2013.01);
(Continued)

(58) Field of Classification Search
CPC ...... F01D 15/10; F01D 25/16; F16C 33/6677; F16C 19/187; F16C 33/6685; F16C 2300/20; F16C 2360/00
(Continued)

(56) References Cited

U.S. PATENT DOCUMENTS 2,634,375 A * 4/1953 Guimbal ................. F03B 13/08
290/52
4,443,707 A * 4/1984 Scieri ...................... F03B 13/06
290/4 A
(Continued)

FOREIGN PATENT DOCUMENTS

DE 102010064450 B3 1/2015
WO WO0238964 A1 5/2002
(Continued)

OTHER PUBLICATIONS

International Preliminary Report on Patentability issued by the International Bureau of WIPO, dated Jan. 31, 2017, for International Application No. PCT/GB2015/052167; 11 pages.
(Continued)

*Primary Examiner* — Mark A Laurenzi
*Assistant Examiner* — Loren C Edwards
(74) *Attorney, Agent, or Firm* — Faegre Drinker Biddle & Reath LLP (57) ABSTRACT

A turbine generator comprises an elongate member, a support structure, a turbine wheel and an electrical generator. The support structure comprises a shaft and support the elongate member for rotation about a rotation axis. The turbine wheel is attached to the elongate member. The electrical generator comprises a rotor and a stator, the rotor being attached to the elongate member and the stator being arranged around the elongate member. The elongate member is provided with a bore and the shaft extends through an end of the elongate member into the bore so as to support it for rotation about the rotation axis.

16 Claims, 4 Drawing Sheets

(51) Int. Cl.
*H02K 7/18* (2006.01)
*F16C 33/66* (2006.01)
*F01D 25/16* (2006.01)
*H02K 9/19* (2006.01)
*F16C 19/18* (2006.01)

(52) U.S. Cl.
CPC ........... *H02K 7/086* (2013.01); *H02K 7/1823* (2013.01); *F16C 19/187* (2013.01); *F16C 33/6685* (2013.01); *F16C 2300/20* (2013.01); *F16C 2360/00* (2013.01); *H02K 9/19* (2013.01)

(58) Field of Classification Search
USPC .......................................................... 60/517
See application file for complete search history.

(56) References Cited

U.S. PATENT DOCUMENTS

| | | | | |
|---|---|---|---|---|
| 4,827,170 A | * | 5/1989 | Kawamura | F01D 15/10 290/52 |
| 6,559,553 B2 | * | 5/2003 | Yumita | F03B 3/00 290/43 |
| 7,434,636 B2 | * | 10/2008 | Sutherland | B60K 6/46 180/2.2 |
| 2007/0075548 A1 | * | 4/2007 | Bagepalli | H02K 15/0006 290/55 |
| 2011/0293404 A1 | * | 12/2011 | Hamad | F03B 11/06 415/118 |
| 2015/0048618 A1 | | 2/2015 | Inomata | |

FOREIGN PATENT DOCUMENTS

| | | |
|---|---|---|
| WO | WO2004076865 A2 | 9/2004 |
| WO | WO2013191176 A1 | 12/2013 |

OTHER PUBLICATIONS

Examination report issued by the United Kingdom Intellectual Property Office, dated Jan. 27, 2015, for related Application No. GB1413315.1; 4 pages.

* cited by examiner

TURBINE GENERATOR WITH AN INTERNAL ROTOR SUPPORT SHAFT

CROSS-REFERENCE TO RELATED APPLICATION

The present application is a National Stage of International Application No. PCT/GB2015/052167, filed Jul. 27, 2015, which claims priority to GB 1413315.1, filed Jul. 28, 2014, the entire disclosures of which are hereby expressly incorporated herein by reference.

The present invention relates to a turbine generator. Particularly, but not exclusively, it may relate to a turbine generator that forms part of an engine system.

A turbine generator comprises a turbine wheel, an electrical generator and an elongate shaft. The electrical generator comprises a rotor and a stator arranged in close proximity so that movement of the rotor induces an electromotive force in the stator. The turbine wheel and the rotor are both are connected to the elongate shaft. The elongate shaft is rotatably supported by two bearings and it is arranged to transmit torque between the turbine wheel and the rotor so that rotation of one causes rotation of the other.

The turbine wheel is arranged to be driven by a fluid. For example, the fluid may comprise exhaust gases of an engine system, or a refrigerant in a closed loop which may form part of a waste heat recovery system for an engine system. As the turbine wheel rotates, so too will the rotor, generating electrical energy by inducing an electromotive force in the stator.

In one type of turbine generator, the electrical generator is axially outboard of the two bearings. This overhanging of the shaft and the rotor can strain the bearings, especially if the axial dimension of the electrical generator is large. In another type of turbine generator, the rotor is disposed between the two bearings. Such a design, wherein the rotor must be mounted on the shaft, which in turn must be mounted in the two bearings can be difficult to assemble. For assembly, the two bearings of such a design are provided in separate housings, which must be accurately aligned during assembly to ensure that the shaft and rotor are well balanced. Such accuracy complicates the assembly of such an arrangement and can be difficult to achieve, resulting in a poorly balanced electrical generator.

It is an object of the invention to provide a turbine generator that at least partially addresses one or more problems or disadvantages present in the prior art.

According to a first aspect of the present invention there is provided a turbine generator comprising: an elongate member; a support structure supporting the elongate member for rotation about a rotation axis; a turbine wheel attached to the elongate member; and an electrical generator, said electrical generator comprising a rotor and a stator, wherein the rotor is attached to the elongate member and the stator is arranged around the elongate member, wherein the elongate member is provided with a bore, and the support structure comprises a shaft, the shaft extending through an end of the elongate member into the bore so as to support it for rotation about the rotation axis.

The first aspect of the invention provides an arrangement wherein the elongate member, to which the turbine wheel and rotor are attached, is supported internally by a single stationary shaft. This is in contrast to prior art arrangements wherein the turbine wheel and rotor are attached to a rotating shaft which is supported externally. Advantageously, such an arrangement is simple to assemble and easier to balance.

The elongate member may be supported by the shaft at two axially displaced points. Advantageously, supporting the elongate member at two axially displaced points provides a more balanced arrangement.

A bearing may be provided between the elongate member and the shaft at each of the two axially displaced points. Since the bearings are both provided between the shaft and the elongate member, such an arrangement is simple to assemble and to balance because such assembly and balancing does not require the accurate alignment of two separate bearing housings.

Each of the bearings may comprise a rolling element bearing.

A first axial section of the elongate member may be supported by the shaft, the rotor may be attached to a second axial section of the elongate member and there may be at least some overlap between the first and second axial sections.

Advantageously, the provision of at least some overlap between the first and second axial sections allows for a more compact turbine generator. This reduces the amount of mass which extends axially away from section of the elongate member which is supported for rotation. This reduces strain on elements of the support structure which are supporting the elongate member.

The bore of the elongate member may be a blind bore. Alternatively, the bore of the elongate member may be a through-bore extending between two opposed ends of the elongate member.

There may be complete overlap between the first and second axial sections. This may mean that: the first axial section is substantially identical to the second axial section; the first axial section is wholly contained within the second axial section; or the second axial section is wholly contained within the first axial section.

The relative positions of the first and second axial sections may be such that the centre of mass of a portion of the turbine generator which is arranged to rotate lies within the first axial section. Advantageously, this reduces strain on elements which are supporting the portion of the turbine generator which is arranged to rotate. The portion of the turbine generator which is arranged to rotate may comprise the elongate member, the rotor and the turbine wheel. The portion of the turbine generator which is arranged to rotate may comprise additional components of the turbine generator.

The rotor may be disposed on, or imbedded in, a radially outer surface of the elongate member.

The rotor may comprise one or more elongate permanent magnets, which may extend axially along the elongate member.

The turbine wheel may be a radial or axial turbine wheel.

The turbine wheel may be connected to an end of the elongate member. This connection may be direct. Alternatively, the connection may comprise an intermediate member disposed between the turbine wheel and the elongate member. Said intermediate member may comprise a tubular sleeve that receives the elongate member. The intermediate member may comprise a lubricant slinger that is operable to direct lubricant toward a lubricant drain. The lubricant slinger may comprise a plurality of radial passageways.

The turbine generator may further comprise a housing. Any or all of the following may be disposed within the housing: the turbine wheel, the shaft, the elongate member and the electrical generator. The housing may comprise a turbine housing; and a generator housing. The turbine housing may be connected to the generator housing in any suitable fashion. The turbine wheel may be disposed within the turbine housing. The shaft, elongate member and electrical generator may be disposed within the generator housing. The housing may further comprise a back plate.

The shaft may extend from a wall of the housing. Said wall may be the back plate. The whole or a part of the shaft may be integral to the wall. Alternatively, the whole or a part of the shaft may be formed separately from the wall and may be attached thereto via a suitable mechanism.

The turbine generator may further comprise a coolant system operable to extract heat from the electrical generator. For this purpose, a wall of the housing may comprise one or more passages within which a coolant may flow. One or more inlets or outlets may be provided to allow coolant to flow into or out of said one or more passages.

The turbine generator may further comprise a lubricant system operable to deliver lubricant to at least one part of the bore in the elongate member.

An axial section of the elongate member may be defined relative to the rotation axis. In particular, an axial section of the elongate member may comprise those parts of the elongate member which lie between first and second positions on the rotation axis.

The first axial section of the elongate member is that axial section of the elongate member which is supported by the support structure for rotation about the rotation axis. In one embodiment, the elongate member is supported by the shaft at two axially displaced points, said two axially displaced points being disposed at opposite ends of the first axial section. For embodiments wherein two bearings are provided between the elongate member and the shaft, the first axial section of the elongate member may be defined as those parts of the elongate member which lie between the two bearings. For embodiments wherein more that two bearings are provided between the elongate member and the shaft, the first axial section of the elongate member may be defined as those parts of the elongate member which lie between the two outermost bearings. For embodiments wherein an axially elongate bearing is provided between the elongate member and the shaft, the first axial section of the elongate member may be defined as those parts of the elongate member which lie between opposing axial ends of the bearing. For embodiments wherein a surface of the elongate member bears against a surface of the shaft, the first axial section of the elongate member may be defined as those parts of the elongate member which lie between the two outermost contact points between the surface of the elongate member and the surface of the shaft.

The second axial section of the elongate member is that axial section of the elongate member to which the rotor is attached. For embodiments wherein the rotor comprises one or more elongate permanent magnets extending axially along the elongate member, the second axial section may be defined as those parts of the elongate member which lie between the two ends of the elongate permanent magnets. For embodiments wherein the elongate member is supported by the support structure at two axially displaced points, the second axial section may lie between the two axially displaced points. Advantageously, such an arrangement allows complete overlap between the first and second axial sections.

The turbine generator may further comprise a mechanism for maintaining the relative axial positions of the elongate member and the shaft.

The elongate member and the electrical generator may be disposed in a generator housing comprising two valves which are arranged to control the flow of lubricant to and from the generator housing.

According to a second aspect of the present invention there is provided a turbine generator comprising: a turbine housing; a generator housing; an elongate member; a support structure supporting the elongate member for rotation about a rotation axis; an electrical generator, said electrical generator comprising a rotor and a stator, wherein the rotor is attached to the elongate member and the stator is arranged around the elongate member; a turbine wheel attached to the elongate member; a mechanism for sensing the pressure within the generator housing; and a mechanism for controlling the pressure within the generator housing, wherein the elongate member, support structure and electrical generator are disposed in the generator housing, and the turbine wheel is disposed in the turbine housing.

Advantageously, such an arrangement provides control over the pressure within the generator housing.

The mechanism for controlling the pressure within the generator housing may be operable to maintain the pressure within the generator housing between upper and lower threshold values.

According to a third aspect of the present invention there is provided an engine system comprising an internal combustion engine and a turbine generator according to the first aspect of the present invention or the second aspect of the present invention.

Embodiments of the present invention will now be described, by way of example only, with reference to the accompanying figures, of which.

Figure 1:
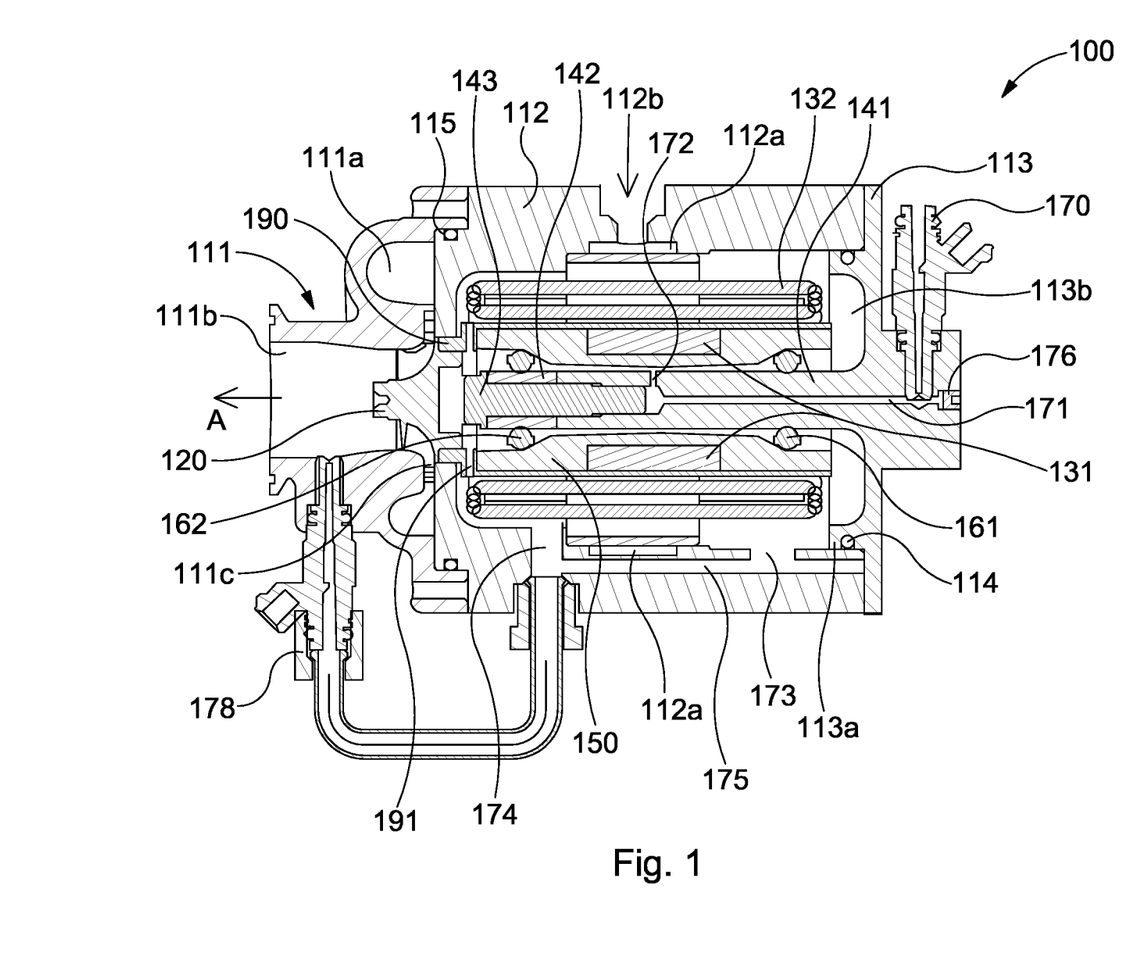
FIG. 1 is a cross sectional view of a radial turbine generator according to an embodiment of the present invention.

Referring to FIG. 1, a turbine generator 100 according to an embodiment of the present invention is illustrated.

The turbine generator 100 comprises a housing, which in turn comprises three parts: a turbine housing 111, a generator housing 112 and a back plate 113. The generator housing 112 comprises a generally cylindrical body.

A first end of the generator housing 112 is open and is arranged to engage with the back plate 113 so as to close said first end. In particular, the back plate 113 comprises an annular protrusion 113a, which is received within the generator housing 112. An outer diameter of the annular protrusion 113a substantially matches an inner diameter of the generator housing 112 at the first end. An o-ring 114 is provided in a groove on an outer surface of the annular protrusion 113a, the o-ring 114 forming a seal between the generator housing 112 and the back plate 113. The back plate 113 is attached to the housing 112 using, for example, one or more screws or bolts (not shown). The back plate 113 is provided with a stub shaft which extends from the back plate 113 into the generator housing 112.

The stub shaft comprises first and second portions 141, 142. A first portion 141 of the stub shaft extends from, and is integral to, the back plate 113. An end of this first portion 141 is provided with a threaded axial bore. A second portion 142 of the stub shaft is hollow, with a bore extending along its length. A bolt 143 passes through the bore in the second portion 142 and engages with the threaded axial bore in the end of the first portion 141.

Although in the present embodiment, the first portion 141 of the stub shaft is integral to the back plate 113, in alternative embodiments the stub shaft may be formed separately from the back plate 113 and be attached thereto via a suitable mechanism. For example, a portion of the stub shaft may be threaded and may engage with a complimentary thread on the back plate 113 so as to maintain the stub shaft in fixed relationship with the back plate 113.

A second, opposite end of the generator housing 112 comprises a central aperture and is arranged to engage with the turbine housing 111. In particular, a portion of the generator housing 112 at the second end has a smaller outer diameter than the rest of the generator housing 112. This portion of the generator housing 112 is received in the turbine housing 111. An outer diameter of the portion of the generator housing 112 at the second end substantially matches an inner diameter of the turbine housing 111. An o-ring 115 is provided in a groove on the outer surface of this portion of the generator housing 112. The o-ring 115 forms a seal between the generator housing 112 and the turbine housing 111. The turbine housing 111 is attached to the generator housing 112 using, for example, screws or bolts (not shown).

The turbine generator 100 further comprises a generally cylindrical elongate member 150. The elongate member 150 is hollow, with a central bore extending therethrough. The stub shaft extends through a first end of the elongate member 150 into the bore so that the elongate member 150 is rotatably mounted on the stub shaft. The stub shaft therefore forms a support structure, which supports the elongate member 150 for rotation about a rotation axis, said rotation axis being defined by the direction of the stub shaft.

First and second rolling element bearings 161, 162 are provided between the elongate member 150 and the stub shaft. Each of the bearings 161, 162 comprises a ring of ball bearings which encircles the stub shaft. The ball bearings may be formed from ceramic or metal. Although in this embodiment rolling element bearings 161, 162 are provided between the elongate member 150 and the stub shaft, in alternative embodiments an inner surface of the elongate member 150 may bear directly against an outer surface of the stub shaft.

The first and second bearings 161, 162 are axially spaced apart.

The central bore extending through the elongate member 150 comprises an end section at each end of the central bore having a larger diameter than a middle section of the central bore. The central bore through the elongate member 150 further comprises a tapered section between the middle section and each end section. An inner diameter of the central section of the central bore is similar to, but slightly larger than, that of the stub shaft. The bearings 161, 162 are received in the end sections of the central bore.

Along with the stub shaft, the first and second bearings 161, 162 provide support for the elongate member 150 at two axially displaced points along its length. Therefore, an axial section of the elongate member 150, being defined as those parts of the elongate member 150 which lie between the first and second bearings 161, 162, is supported by the stub shaft via the two bearings 161, 162. Although support is provided at two discrete axially displaced points, in alternative embodiments the elongate member 150 may be supported at more points or substantially continuously along an axial section thereof.

An inner surface of the elongate member 150 forms an outer race of the first and second bearings 161, 162. In alternative embodiments, the outer race of the bearings 161, 162 may be formed separate from, and connected to, an inner surface of the elongate member 150. An arrangement wherein an inner surface of the elongate member 150 forms an outer race of the first and second bearings 161, 162 allows the parts of the turbine generator 100 that rotate to be radially more compact. This is advantageous since it allows the turbine generator 100 to operate at higher speeds.

An outer surface of the stub shaft forms an inner race of the first and second bearings 161, 162. In particular, the inner race of the first bearing 161, which is disposed closer to the back plate 113, is formed by the first portion 141 of the stub shaft. The inner race of the second bearing 162 is formed by the second portion 142 of the stub shaft. In alternative embodiments, the inner race of the bearings 161, 162 may be formed separate from, and connected to, an outer surface of the stub shaft.

During assembly, the first bearing 161 is mounted on the first portion 141 of the stub shaft. Subsequently, the elongate member 150 is mounted on the first portion 141 of the stub shaft, the first bearing 161 being received within a first end section of the bore through the elongate member 150. The second bearing 162 is mounted on the second portion 142 of the stub shaft and these are inserted into a second end section of the bore through the elongate member 150. Finally, a shank of bolt 143 is inserted through the bore in the second portion 142 and engages with the threaded axial bore in the end of the first portion 141. In combination, the bearings 161, 162, the bolt 143, the bore in the second portion 142 and the threaded axial bore in the first portion 141 provide a mechanism for maintaining the relative axial positions of the elongate member 150 and the stub shaft. Tightening the bolt 143 applies a pre-load to the bearings 161, 162. This improves the concentricity of the elongate member 150 and the stub shaft, improving the balance of the turbine generator 100.

The turbine generator 100 further comprises a plurality of permanent magnets 131 and a plurality of windings 132. The permanent magnets 131 and the windings 132 form the rotor and stator respectively of an electrical generator. The permanent magnets 131 provide a magnetic field and the windings 132 act as the armature of the electrical generator.

The permanent magnets 131 are arranged on the elongate member 150, circumferentially spaced apart. The permanent magnets 131 are embedded in a wall of the elongate member 150, being received within a plurality of recesses on a radially outer surface of the elongate member 150. Each permanent magnet 131 is elongate, extending axially along the elongate member 150. Axially, the permanent magnets 131 are disposed between the first and second bearings 161, 162. Therefore there is complete overlap between an axial section of the elongate member 150 which is supported and an axial section of the elongate member 150 to which the magnets 131 are attached.

The plurality of windings 132 comprise one or more coiled wires and are arranged around the elongate member 150. The one or more wires are radially outward from the elongate member 150 and are coiled to form a plurality of axially extending elongate loops that are circumferentially spaced around the elongate member 150. The turbine generator 100 may further comprise a ferromagnetic yoke about which the one or more coils are wound. The yoke may take the form of a hollow cylinder concentric with the elongate member.

The turbine generator 100 further comprises a turbine wheel 120. The turbine wheel 120 is connected to a second end of the elongate member 150 via an intermediate member 190. The intermediate member 190 comprises a tubular sleeve that receives the elongate member 150. The turbine wheel 120 is connected to an end of the intermediate member 190 by, for example, a push-fit connection. Between the turbine wheel 120 and the elongate member 150, the intermediate member 190 is provided with a plurality of radial passageways 191. These radial passageways 191 act as a lubricant slinger to direct lubricant radially outwards, as will be described further below.

The stub shaft, the elongate member 150, the permanent magnets 131 and the windings 132 are disposed within the generator housing 112. The intermediate member 190 extends through the central aperture in the second end of the generator housing 112. The intermediate member 190 acts to retain the permanent magnets 131 within the recesses on the radially outer surface of the elongate member 150.

Since the permanent magnets 131 are disposed within the intermediate member 190, the intermediate member 190 is preferably formed from a non-magnetic material. Otherwise the intermediate member 190 may act to at least partially shield the windings from the permanent magnets. For example, the intermediate member 190 may be formed from carbon fibre or an austenitic nickel-chromium based superalloy such as that marketed under the trademark Inconel.

The turbine wheel 120 is disposed within the turbine housing 111. The turbine housing 111 comprises an inlet volute 111a, through which a working fluid may enter the turbine housing 111 and drive the turbine wheel 120. The working fluid may comprise the working fluid of a waste heat recovery system comprising an organic Rankine cycle (ORC). Alternatively, the working fluid may comprise exhaust gases from an engine. In the present embodiment, the turbine wheel 120 is a radial turbine wheel. A plurality of guide vanes 111c are provided between the inlet volute 111a and the turbine wheel 120. The guide vanes 111c act to direct the flow of fluid such that it drives the turbine wheel 120 to rotate. The turbine housing 111 further comprises an outlet 111b, through which fluid that has driven the turbine wheel 120 may exit the turbine housing 111 in a generally axial direction, as indicated by arrow A.

As fluid flows through the turbine housing 111, it will drive the turbine wheel 120 causing it to rotate. As the turbine wheel 120 rotates, so too will the elongate member 150 and the permanent magnets 131 embedded therein. The rotation of the permanent magnets 131 generates electrical energy by inducing an electromotive force, causing a current to flow through the windings 132. This electrical energy may be used for any desired purpose and may augment energy output by another power source.

The induced current flowing through the windings 132 will generate heat. It is therefore desirable to provide a coolant system which is operable to extract heat from the electrical generator. For this purpose, a central portion of the wall of the generator housing 112 is provided with an annular channel 112a. One or more radial ports 112b, which connect the annular channel 112a to an outer surface of the generator housing 112, are provided to allow a coolant to be introduced into and extracted from the annular channel 112a. As coolant passes through the annular channel, it may extract heat generated by the windings 132. The annular channel 112a and one or more radial ports 112b therefore form part of a coolant system which is operable to extract heat from the electrical generator. The coolant system may comprise: a closed loop, which the annular channel 112a and one or more radial ports 112b form part of; a pump (not shown) operable to pump coolant through the closed loop; and a mechanism (not shown) for extracting heat from the coolant.

With the exception of the radial ports 112b, the annular channel 112a is a closed channel within the wall of the generator housing 112. In particular, the annular channel 112a is not in communication with the interior of the generator housing 112, and the coolant therefore does not come into contact with the parts disposed within the housing. The annular channel 112a and the radial ports 112b may be formed in any convenient way. The main body of the generator housing 112 may be formed by moulding or casting, and an annular groove may be formed on an inner surface of the generator housing 112 during the moulding or casting process. During a subsequent step, an annular wall may be formed over the annular groove to form a closed channel within the wall of the generator housing 112. Finally, the radial ports 112b may be machined by drilling.

Alternative embodiments may comprise other configurations of coolant channels and inlet/outlet ports within the walls of the generator housing 112 as desired or required.

In use, the elongate member 150 may rotate at high speeds relative to the stub shaft. For example, the elongate member may rotate at speeds up to 80,000 revolutions per minute and may rotate at speeds up to 120,000 revolutions per minute. At such high speeds effective lubrication is important to avoid premature failure through wear or seizure. Therefore, the turbine generator 100 further comprises a lubricant system operable to deliver lubricant to the bearings 161, 162.

Lubricant, is delivered to the generator housing 112 via the back plate 113. The lubricant may comprise oil. Alternatively, the lubricant may comprise a refrigerant. For embodiments wherein the turbine generator 100 forms part of a waste heat recovery system comprising an organic Rankine cycle (ORC), the lubricant may comprise the working fluid of the ORC. The back plate 113 is provided with an injector 170, which is operable to introduce lubricant into the back plate 113. The injector 170 acts as a valve to control the flow of lubricant into the generator housing 112 and any other suitable valve may alternatively be used. The injector 170 may be further operable to monitor how much lubricant is introduced. An axial passage 171 extends through the back plate, and along the stub shaft. A radial passage 172 is located towards the middle of the stub shaft and connects the axial passage 171 to an outer surface of the stub shaft.

The radial passage 172 may be formed by drilling into the stub shaft. The axial passage 171 may be formed by drilling through the back plate 113 and into the stub shaft. If so, the axial passage 171 will be open, one end of the axial passage 171 forming an aperture on a surface of the back plate 113. The injector 170 may connect to said aperture, extending axially away from the back plate 113. In the present embodiment, the injector 170 does not connect to the aperture formed during the drilling process. Rather, the injector 170 connects to the axial passage 171 at a position spaced from the aperture, extending in a radial direction. Such an arrangement is more compact. A plug 176 is provided to seal the aperture formed during the drilling process.

In use, lubricant is introduced into the back plate via the injector 170, flows along the axial passage 171, along the radial passage 172 to a space between the inner surface of the elongate member 150 and the outer surface of the stub shaft.

The diameter of the middle section of the central bore extending through the elongate member 150 is not constant, with the diameter being smallest in the middle and increasing towards the end sections at either end. The position of the radial passage 172 is such that lubricant is delivered to the middle of the middle section. As the elongate member 150 rotates, any lubricant on the inner surface thereof will experience a centrifugal force and will be forced axially along the surface towards the two bearings 161, 162.

Two lubricant drains 173, 174 are disposed at opposite ends of the generator housing 112, at a position which in use will form a lower portion of the generator housing 112. The two drains 173, 174 are connected by an axially extending passage 175 formed in a wall of the generator housing 112.

Lubricant that passes the first bearing 161, which is disposed closer to the back plate 113, will collect in an annular recess 113b in the back plate disposed between the annular protrusion 113a and the stub shaft. The lubricant will then drain under gravity to a first lubricant drain 173. Lubricant that passes the second bearing 162 will pass through the radial passages 191 formed in the intermediate member 190. The lubricant will then drain under gravity to a second lubricant drain 174.

Lubricant passing out of the generator housing 112 via the two lubricant drains may be directed to any suitable location. In the present embodiment, the lubricant passes into the outlet 111b of the turbine housing 111 via a second injector 178. The second injector 178 acts as a valve to control the flow of lubricant out of the generator housing 112 and any other suitable valve may alternatively be used. The second injector 178 may be operable to monitor how much lubricant passes into the outlet 111b of the turbine housing 111.

The novel configuration of the turbine generator 100 allows it to be very well balanced, which, in turn, allows it to operate at very high speeds. In order to facilitate high speed operation there may not be a seal between the intermediate member 190 and the generator housing 112. The clearance between the intermediate member 190 and the circular aperture in the second end of the generator housing 112 may be very small. However, any gap between the intermediate member 190 and the generator housing 112 may allow the working fluid to flow into the generator housing 112, causing loss of performance of the turbine. By providing two valves (injectors 170, 178) which control the flow of lubricant into and out of the generator housing 112, the pressure within the generator housing 112 can be controlled so as to prevent, or at least reduce, the flow of working fluid into the generator housing 112 from the turbine housing 111, as is now described.

As lubricant flows into the generator housing 112, through radial passage 172, it may flash boil and form a vapour. This will increase the pressure within the generator housing 112. Liquid lubricant may drain under gravity through lubricant drains 173, 174, as described above. Injectors 170, 178 may be operated such that the pressure within the generator housing 112 is maintained above that of the inlet volute 111a of the turbine housing 111. Injectors 170, 178 may be operated such that the pressure within the generator housing 112 is maintained between upper and lower threshold values, which are both higher than that of the inlet volute 111a of the turbine housing 111.

Injector 170 is used to supply lubricant to the bearings 161, 162 during use. This supply of lubricant may be either continuous or intermittent. As more lubricant enters the generator housing 112, the pressure within the generator housing 112 will increase. The generator housing 112 is provided with a pressure sensor (not shown) that is operable to determine the pressure within the generator housing 112. Once the pressure within the generator housing 112 reaches a predetermined upper threshold value, injector 178 is opened to vent liquid lubricant out into the outlet 111b of the turbine housing 111. The pressure within the generator housing 112 may be sufficient to eject the liquid lubricant from the generator housing 112. Once the pressure within the generator housing 112 reaches a predetermined lower threshold value, injector 178 is closed.

For embodiments wherein the working fluid that drives the turbine wheel 120 and the lubricant comprise different fluids, a mechanism for separating the lubricant from the working fluid may be provided downstream of the outlet 111b of the turbine housing 111.

The injectors 170, 178 may be controlled by a processor (not shown). The processor may form part of the turbine generator 100 or may be provided separate from the turbine generator 100. The processor may be operable to receive a signal output by the pressure sensor, which is indicative of the pressure within the generator housing 112. The processor may be further operable, in response to said signal, to control the injectors 170, 178 such that lubricant is supplied to the bearings 161, 162 at a sufficient rate and that the pressure within the generator housing 112 is maintained between upper and lower threshold values. In response to the signal from the pressure sensor, the processor may be operable to determine how the injectors should be operated in order to achieve this. This determination may be a result of the processor executing an algorithm. Alternatively, the determination may be achieved by consulting a look up table or the like.

Advantageously, since there is complete overlap between an axial section of the elongate member 150 which is supported and an axial section of the elongate member 150 to which the magnets 131 are attached, the turbine generator 100 is more compact than some prior art turbine generators. This feature also reduces the amount of mass which extends axially away from the section of the elongate member 150 that is supported for rotation. This reduces strain on the stub shaft and the bearings 161, 162, which support the elongate member 150.

Figure 2:
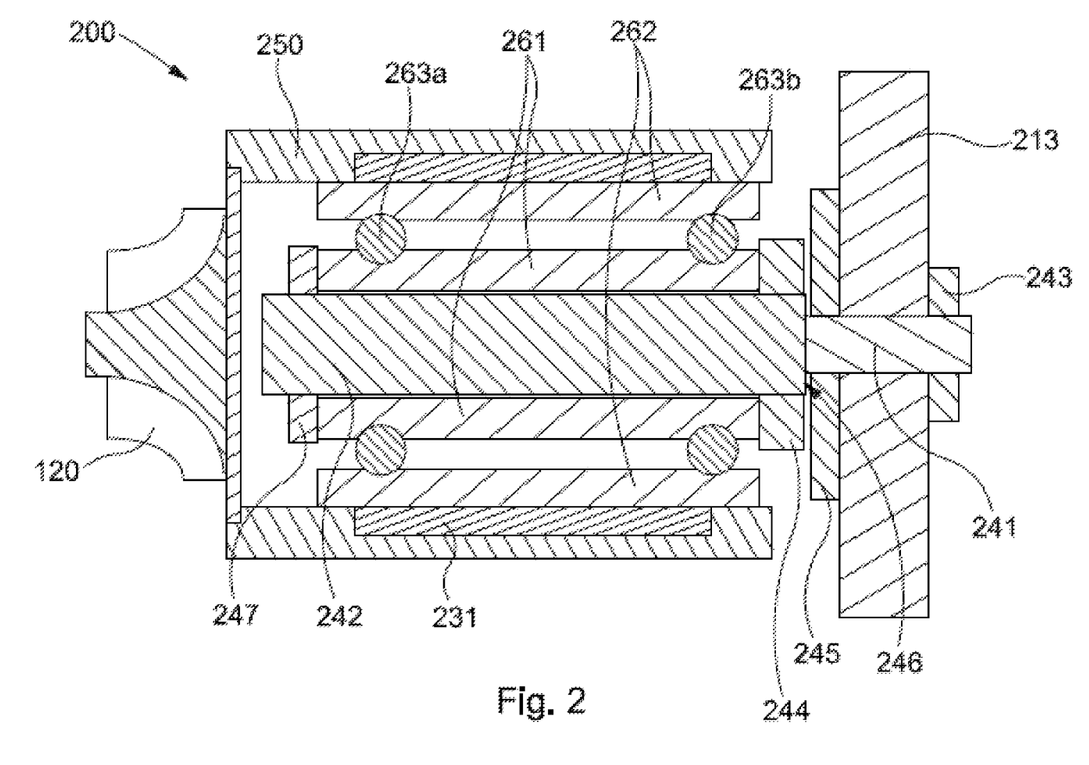
FIG. 2 is a cross sectional view of part of an alternative radial turbine generator according to another embodiment of the present invention.

Referring now to FIG. 2, part of a second radial turbine generator 200 according to an embodiment of the present invention is illustrated.

In the following, only the differences between the first and second turbine generators 100, 200 will be described in detail. Corresponding parts of the first and second turbine generators 100, 200 which are substantially identical share common labels.

The second radial turbine generator 200 comprises: a stub shaft, a bearing assembly, an elongate member 250 and a turbine wheel 120.

The second radial turbine generator 200 may comprise a housing, although only a section of a single wall 213 of a housing is shown.

The stub shaft comprises two portions 241, 242 with different diameters, the intersection of which forms a step 246. A first portion 241 of the stub shaft with a first diameter passes through an aperture in the wall 213. A second portion 242 of the stub shaft with a second, larger diameter extends from the wall 213 in a direction substantially perpendicular thereto. A washer 245 is mounted on the first portion of the stub shaft, between the step 246 and the wall 213.

The stub shaft is attached to the wall 213 using two nuts which engage with threaded sections of the stub shaft on opposite sides of the wall 213. A first nut 243 engages with an external thread on the first portion 241 of the stub shaft on an outer side of the wall 213 and a second nut 244 engages with an external thread on the second portion 242 of the stub shaft on an inner side of the wall 213.

The generally cylindrical elongate member 250 is hollow, with a central bore extending therethrough. The second portion 242 of the stub shaft extends through a first end of the elongate member 250 into the bore so that the elongate member 250 is rotatably mounted on the stub shaft. The stub shaft therefore forms a support structure, which supports the elongate member 250 for rotation about a rotation axis.

The bearing assembly is disposed between the elongate member 250 and the second portion 242 of the stub shaft. Said bearing assembly comprises an inner race 261, an outer race 262 and two axially spaced rolling element bearings 263a, 263b. Each bearing 263a, 263b comprises a ring of rolling elements such as ball bearings. The inner race 261 of the bearing assembly is mounted on the second portion 242 of the stub shaft. A preload nut 247 engages with an external thread on the second portion 242 of the stub shaft, clamping the inner race 261 of the bearing assembly between the preload nut 247 and the second nut 244. The outer race 262 of the bearing assembly is mounted in the elongate member 250. The outer dimension of the outer race 262 substantially matches an inner dimension of the elongate member 250 such that an outer surface of the outer race 262 engages an inner surface of the elongate member 250.

The turbine wheel 120 is connected to a second end of the elongate member 250.

The turbine generator 200 further comprises a plurality of permanent magnets 231 and a plurality of windings (not shown). The permanent magnets 231 and the windings form the rotor and stator respectively of an electrical generator. The permanent magnets 231 are arranged on the elongate member 250, circumferentially spaced apart.

The permanent magnets 231 are embedded in a wall of the elongate member 250, being received within a plurality of recesses on a radially inner surface of the elongate member 250. Once the outer race 262 of the bearing assembly has been mounted in the elongate member 250, it acts to retain the permanent magnets 231 within the recesses.

Since the permanent magnets 231 are received within recesses on a radially inner surface of the elongate member 250, the elongate member 250 is preferably formed from a non-magnetic material. Otherwise the elongate member may act to at least partially shield the windings from the permanent magnets. For example, the elongate member 250 may be formed from carbon fibre or an austenitic nickel-chromium based superalloy such as that marketed under the trademark Inconel.

Therefore there is substantial overlap between an axial section of the elongate member 250 which is supported by the stub shaft and the bearings 263a, 263b and an axial section of the elongate member 250 to which the magnets 231 are attached.

Figure 3:
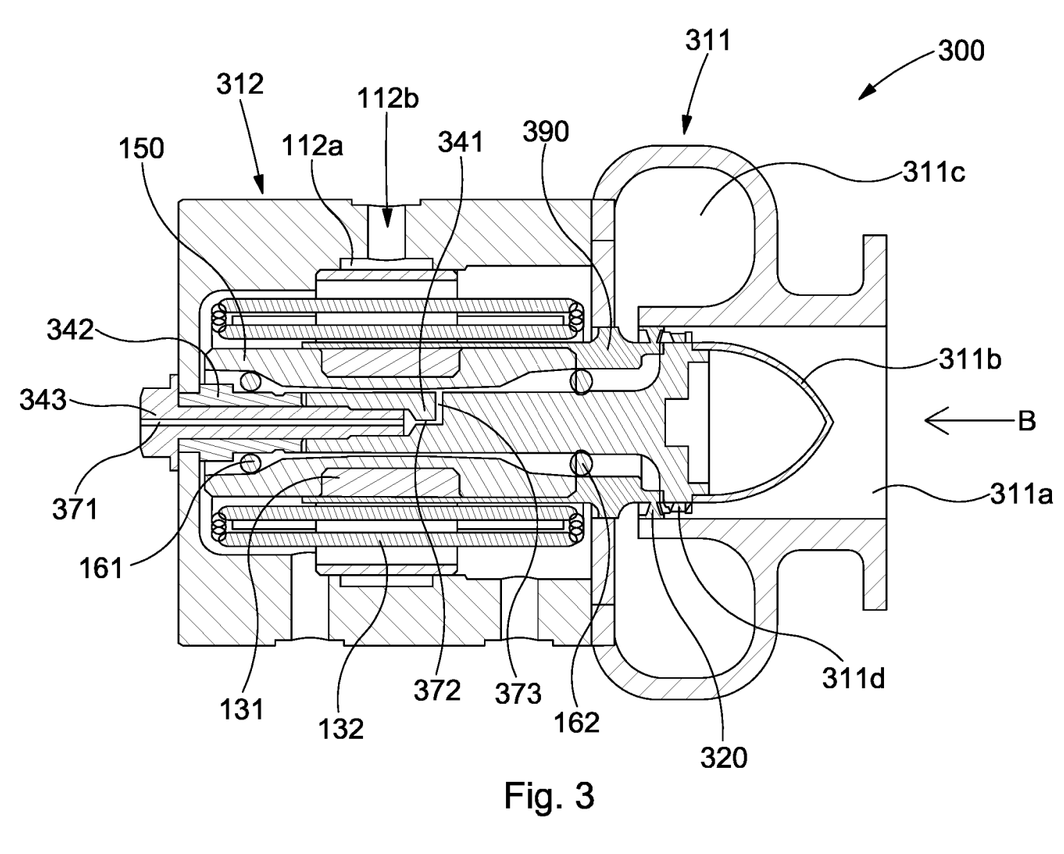
FIG. 3 is a cross sectional view of an axial turbine generator according to another embodiment of the present invention.

Referring now to FIG. 3, a third turbine generator 300 according to an embodiment of the present invention is illustrated.

The third turbine generator 300 differs from the first turbine generator 100 in that the turbine is an axial turbine. In the following, only the differences between the first and third turbine generators 100, 300 will be described in detail. Corresponding parts of the first and third turbine generators 100, 300 which are substantially identical share common labels.

The turbine generator 300 comprises a housing, which in turn comprises two parts: a turbine housing 311 and a generator housing 312.

The generator housing 312 comprises a generally cylindrical body. A first end of the generator housing 312 is open and is arranged to engage with the turbine housing 311 so as to close said first end. A second, opposite end of the generator housing 312 is provided with a central aperture.

The turbine housing 311 comprises a generally cylindrical inlet 311a, through which fluid such as, for example, exhaust gases may enter the turbine housing 311 in a generally axial direction, as indicated by arrow B. An inlet cone 311b is mounted in, and concentric with, the inlet 311a and guides fluid flowing into the turbine housing 311 through an annular passageway. The fluid passes through said annular passageway and drives an axial turbine wheel 320. A plurality of guide vanes 311d extend radially outwards into said annular passage and act to direct the flow of fluid such that it drives the axial turbine wheel 320 to rotate. Fluid that has driven the turbine wheel 320 passes into an outlet volute 311c, through which it may exit the turbine housing via an exit (not shown).

A shaft extends through the generator housing 312 between the second end of the generator housing 312 and the inlet cone 311b in the turbine housing 311. The shaft comprises a first portion 341, which is integral with, or connected to, the inlet cone 311b and a second portion 342, which is proximate to the second end of the generator housing 312. The generator housing 312, the second portion 342 and the first portion 341 of the shaft are connected together by a bolt 343. A shank of the bolt 343 passes through the aperture in the second end of the generator housing 312, through a bore in the second portion 342 and engages with a threaded bore in the first portion 341.

The inlet cone 311b may be connected to the turbine housing 311 by one or more radial struts (not shown). Alternatively, the shaft may be a stub shaft which is only supported at one end by the generator housing 312 via connecting bolt 343.

Similarly to the first turbine generator 100, the turbine generator 300 further comprises a plurality of permanent magnets 131 and a plurality of windings 132, which form an electrical generator.

The turbine generator 300 further comprises a generally cylindrical elongate member 150, which is substantially identical to that of the first turbine generator 100.

As with the first turbine generator, the shaft extends through the central bore of the elongate member 150 so that the elongate member 150 is rotatably mounted on the shaft. As with the first turbine generator, two axially spaced bearings 161, 162 are provided between the elongate member 150 and the shaft. In alternative embodiments an inner surface of the elongate member 150 may bear directly against an outer surface of the shaft.

Once again, in this embodiment, there is complete overlap between an axial section of the elongate member 150 which is supported and an axial section of the elongate member 150 to which the magnets 131 are attached.

The turbine wheel 320 is connected to a second end of the elongate member 150 via an intermediate member 390. The intermediate member 390 comprises a tubular sleeve that receives the elongate member 150 and the turbine wheel 320 is connected to an end of the intermediate member 390 or may be integrally formed therewith.

An annular channel 112a and one or more radial ports 112b are provided in the generator housing which form part of a coolant system that is similar to that disclosed above in connection with the first turbine generator 100. Alternative embodiments may comprise other configurations of coolant channels and inlet/outlet ports within the walls of the generator housing 112 as desired or required.

An axial passage extends along the stub shaft. The axial passage is formed by a through bore 371 in the connecting bolt 343 and a blind bore 372 in the first portion 341 of the shaft. A radial passage 373 is located towards the middle of the stub shaft and connects the axial bore 372 of the first portion 341 to an outer surface of the stub shaft. In use, lubricant is introduced into the axial bore 371 in the connecting bolt 343, flows along the axial passage, along the radial passage 373 to a space between the inner surface of the elongate member 150 and the outer surface of the stub shaft.

Figure 4:
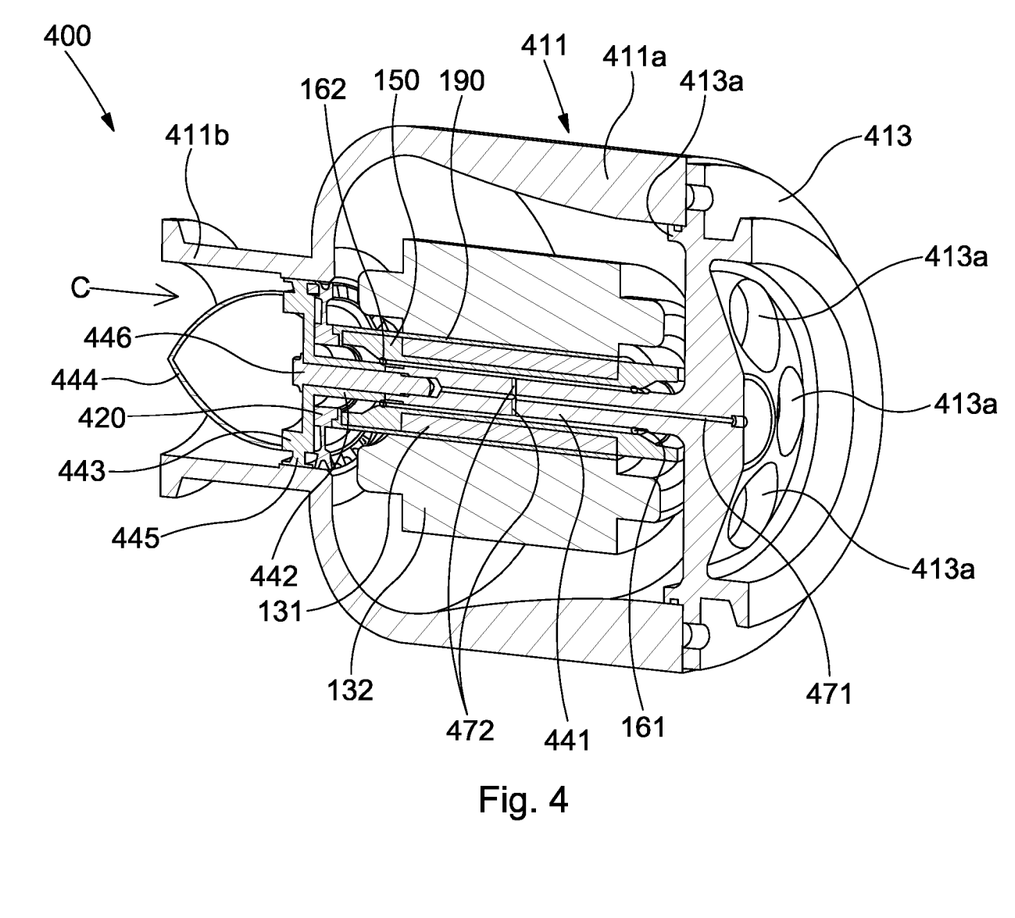
FIG. 4 is a partial cross section perspective view of an alternative axial turbine generator according to another embodiment of the present invention.

Referring now to FIG. 4, a fourth turbine generator 400 according to an embodiment of the present invention is illustrated.

The fourth turbine generator 400 differs from the first turbine generator 100 in that the turbine is an axial turbine. In the following, only the differences between the first and fourth turbine generators 100, 400 will be described in detail. Corresponding parts of the first and fourth turbine generators 100, 400 which are substantially identical share common labels.

The turbine generator 400 comprises a housing, which in turn comprises two parts: a main housing 411 and a back plate 413. The main housing 411 comprises coaxial first and second cylindrical portions 411a, 411b. The first cylindrical portion 411a is open and is arranged to engage with the back plate 413.

Similarly to the first turbine generator 100, the turbine generator 400 further comprises a plurality of permanent magnets 131 and a plurality of windings 132, which form an electrical generator. The first cylindrical portion 411a houses the electrical generator.

The back plate comprises an annular protrusion 413a, which is received within the first portion 411a of the main housing 411. An outer diameter of the annular protrusion substantially matches an inner diameter of the first portion 411a of the main housing 411. An o-ring (not shown) is provided in a groove on an outer surface of the annular protrusion to form a seal between the first portion 411a of the main housing 411 and the back plate 413. The back plate 413 is attached to the main housing 411 using, for example, one or more screws or bolts (not shown).

The back plate 413 is provided with a shaft which extends from the back plate 413 into the main housing 411. The shaft comprises first and second portions 441, 442. The first portion 441 of the shaft extends from, and is integral to, the back plate 413. An end of this first portion 441 is provided with a threaded axial bore. The second portion 442 of the shaft is hollow, with a bore extending along its length. A bolt 446 passes through the bore in the second portion 442 and engages with the threaded axial bare in the end of the first portion 441.

The back plate 413 is further provided with a plurality of axially facing exit apertures 413a.

The turbine generator 400 further comprises a turbine wheel 420. The turbine wheel 420 is connected to a second end of the elongate member 150 via an intermediate member 190. The intermediate member 190 comprises a tubular sleeve that receives the elongate member 150. The turbine wheel 420 is connected to an end of the intermediate member 190 by, for example, a push-fit connection.

The second portion 411b of the main housing 411 provides an axial inlet through which a working fluid may enter the main housing 411 and drive the turbine wheel 420. The turbine wheel 420 is an axial turbine wheel, wherein the working fluid enters and exits in an axial direction.

An annular support 443 extends radially from the second portion 442 of the shaft. An inlet cone 444 is mounted on the annular support 443 such that it is concentric with the second portion 411b of the main housing 411. In use, the working fluid enters the second portion 411b of the main housing 411 axially, as indicated by arrow C. The inlet cone 444 guides the working fluid flowing into the first portion 411a of the main housing 411 through an annular passageway. The fluid passes through said annular 35 passageway and drives the axial turbine wheel 420. A plurality of guide vanes 445 extend radially between the annular support 443 and a wall of the second portion 411b of the main housing 411. The guide vanes 445 act to direct the flow of fluid such that it drives the turbine wheel 420 to rotate.

Once the working fluid has driven the turbine wheel 420, it continues to flow axially through the first portion 411a of the main housing 411 and exits the main housing 411 through the plurality of exit apertures 413a provided in the back plate 413. As the working fluid flows through the first portion 411a of the main housing 411, it may provide some cooling of the windings 132. Additionally or alternatively, a stator shield (not shown) may be provided to guide the flow of working fluid smoothly over the windings 132.

The turbine generator 400 further comprises a generally cylindrical elongate member 150, which is substantially identical to that of the first turbine generator 100. As with the first turbine generator 100, the shaft extends through the central bore of the elongate member 150 so that the elongate member 150 is rotatably mounted on the shaft. As with the first turbine generator 100, two axially spaced bearings 161, 162 are provided between the elongate member 150 and the shaft. In alternative embodiments an inner surface of the elongate member 150 may bear directly against an outer surface of the shaft. In a manner similar to the first embodiment 100, lubricant is delivered to the two bearings 161, 162 from the back plate 413, via an axial passage 471 extending along the shaft and radial passages 472 connecting the axial passage 471 to an outer surface of the shaft. Once again, in this embodiment 400, there is complete overlap between an axial section of the elongate member 150 which is supported and an axial section of the elongate member 150 to which the magnets 131 are attached.

The embodiments of turbine generators 100, 200, 300, 400 according to the invention may form part of an engine system. The engine system may comprise an internal combustion engine and a turbine generator according to the invention. For such embodiments, the fluid that drives the turbine wheel may comprise exhaust gases of the engine system, or a refrigerant in a closed loop which forms part of a waste heat recovery system for the engine system.

In the above embodiments, the elongate member 150, 250, 350 is rotatably mounted on a shaft, a pair of bearings being provided between the elongate member and the shaft. The shaft and the pair of bearings form a support structure for the elongate member. In particular, a first axial section of the elongate member, defined as those parts of the elongate member which lie between the two bearings, is supported for rotation about an axis.

In the above embodiments, the rotor of the electrical generator is of the form of a plurality of permanent magnets.

The permanent magnets are elongate, extending axially along the elongate member, and are arranged on the elongate member circumferentially spaced apart. The rotor may be said to be attached to a second axial section of the elongate member, said second axial section being defined as those parts of the elongate member which lie between the two ends of the elongate permanent magnets.

In each embodiment, there is at least some overlap between the first and second axial sections. Advantageously, since the first and second axial sections overlap, the invention allows for a more compact turbine generator. The invention also reduces the amount of mass which extends axially away from the section of the elongate member which is supported for rotation. This reduces strain on the shaft and the bearings, which support the elongate member.

Further, each embodiment comprises an elongate member provided with a bore and a shaft, which supports the elongate member. In use, the elongate member rotates while the shaft remains fixed. This is in contrast to prior art arrangements, which comprise a shaft that rotates during use. Such an arrangement is simple to assemble and easy to balance.

It may be preferable for there to be complete overlap between the first and second axial sections, as is the case for turbine generators 100, 300, 400. However, alternative embodiments wherein there is partial overlap between the first and second axial sections would also benefit from the advantages of the invention (although to a lesser extent).

In the embodiments discussed above, the relative positions of the first and second axial sections are such that the centre of mass of a portion of the turbine generator which is arranged to rotate lies within the first axial section. The portion of the turbine generator which is arranged to rotate comprises the elongate member, the rotor, the turbine wheel and, optionally, an intermediate member. Advantageously, this reduces strain on elements which are supporting the elongate member.

In the embodiments described above two bearings are provided between the elongate member and the shaft. However, in alternative embodiments, a surface of the elongate member may bear against a surface of a support member.

The invention claimed is:

1. A turbine generator comprising:
an elongate member;
a support structure supporting the elongate member for rotation about a rotation axis;
a turbine wheel attached to the elongate member; and
an electrical generator, said electrical generator comprising a rotor and a stator, wherein the rotor is attached to the elongate member and the stator is arranged around the elongate member,
wherein the elongate member is provided with a bore, and the support structure comprises a shaft, the shaft extending through an end of the elongate member into the bore so as to support the elongate member for rotation about the rotation axis,
wherein the elongate member is supported by the shaft at two axially displaced points and is unsupported therebetween;
wherein a bearing is provided between the elongate member and the shaft at each of the two axially displaced points;
wherein a first axial section of the elongate member is supported by the shaft, the rotor is attached to a second axial section of the elongate member and there is at least some overlap between the first and second axial sections;
wherein relative positions of the first and second axial sections are such that a centre of mass of a portion of the turbine generator which is arranged to rotate lies within the first axial section; and
wherein the portion of the turbine generator which is arranged to rotate comprises the elongate member, the rotor and the turbine wheel.

2. The turbine generator as claimed in claim 1 wherein each of the bearings comprises a rolling element bearing.

3. The turbine generator of claim 1, wherein there is complete overlap between the first and second axial sections.

4. The turbine generator as claimed in claim 1, wherein the rotor is disposed on, or imbedded in, a radially outer surface of the elongate member.

5. The turbine generator of claim 1, further comprising a housing.

6. The turbine generator of claim 5, wherein any or all of the following are disposed within the housing: the turbine wheel, the shaft, the elongate member, and the electrical generator.

7. The turbine generator of claim 5, wherein the shaft extends from a wall of the housing.

8. The turbine generator of claim 7, wherein at least a part of the shaft is integral to the wall.

9. The turbine generator of claim 7, wherein the shaft is formed separate from the wall and attached thereto.

10. The turbine generator of claim 1, further comprising a coolant system operable to extract heat from the electrical generator.

11. The turbine generator of claim 1, further comprising a lubricant system operable to deliver lubricant to at least one part of the bore in the elongate member.

12. The turbine generator of claim 1, wherein the turbine wheel is connected to an end of the elongate member via an intermediate member, said intermediate member comprising a tubular sleeve that receives the elongate member.

13. The turbine generator of claim 1, wherein the elongate member and the electrical generator are disposed in a generator housing, which comprises two valves which are arranged to control a flow of lubricant to and from the generator housing.

14. The turbine generator of claim 1, further comprising:
a turbine housing;
a generator housing;
a mechanism for sensing the pressure within the generator housing; and
a mechanism for controlling the pressure within the generator housing,
wherein the elongate member, support structure and electrical generator are disposed in the generator housing, and the turbine wheel is disposed in the turbine housing.

15. The turbine generator of claim 14, wherein the mechanism for controlling the pressure within the generator housing is operable to maintain the pressure within the generator housing between upper and lower threshold values.

16. An engine system comprising an internal combustion engine and the turbine generator as claimed in claim 1.

* * * * *